(12) United States Patent
Clementson et al.

(10) Patent No.: US 10,178,211 B2
(45) Date of Patent: Jan. 8, 2019

(54) LIGHTING FOR AUDIO DEVICES

(71) Applicant: DOLBY LABORATORIES LICENSING CORPORATION, San Francisco, CA (US)

(72) Inventors: David Clementson, Penngrove, CA (US); David S. McGrath, Rose Bay (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 321 days.

(21) Appl. No.: 14/895,418

(22) PCT Filed: Jun. 5, 2014

(86) PCT No.: PCT/US2014/041096
§ 371 (c)(1),
(2) Date: Dec. 2, 2015

(87) PCT Pub. No.: WO2014/197697
PCT Pub. Date: Dec. 11, 2014

(65) Prior Publication Data
US 2016/0119459 A1    Apr. 28, 2016

Related U.S. Application Data

(60) Provisional application No. 61/832,032, filed on Jun. 6, 2013.

(51) Int. Cl.
*H04M 1/22* (2006.01)
*H04M 1/62* (2006.01)
(Continued)

(52) U.S. Cl.
CPC .............. *H04M 1/22* (2013.01); *F21V 5/002* (2013.01); *F21V 33/0056* (2013.01);
(Continued)

(58) Field of Classification Search
CPC . G02B 6/0025; G02F 1/13318; G08B 17/107; H04M 1/22; H04M 1/72588; H04R 1/08; H04R 1/028; H04N 7/15
(Continued)

(56) References Cited

U.S. PATENT DOCUMENTS 4,023,887 A  *  5/1977  Speers ................ G02B 6/3504
                                                    250/227.28
5,138,154 A  *  8/1992  Hotelling ............... G01C 19/28
                                                    250/231.12
(Continued)

FOREIGN PATENT DOCUMENTS

CN        101681185        3/2010
CN        202168180        3/2012
(Continued)

*Primary Examiner* — Gerald Gauthier

(57) ABSTRACT

An apparatus may include an inner module, an outer module that substantially surrounds a perimeter of the inner module, a plurality of light emitters, and a light distribution medium. The plurality of light emitters may be positioned under the inner module and project light radially outward. The light distribution medium may transport the light projected from the plurality of light emitters to an edge of the light distribution medium. The edge may include a diffusive surface and traverse a substantial portion of a boundary between the inner module and the outer module.

21 Claims, 9 Drawing Sheets

(51) Int. Cl.
*F21V 8/00* (2006.01)
*F21V 5/00* (2018.01)
*F21V 33/00* (2006.01)
*G02B 5/02* (2006.01)
*H04R 1/02* (2006.01)

(52) U.S. Cl.
CPC ........... *G02B 5/021* (2013.01); *G02B 6/0001* (2013.01); *G02B 6/0045* (2013.01); *H04M 1/62* (2013.01); *H04R 1/028* (2013.01)

(58) Field of Classification Search
USPC .... 345/589; 362/34, 247, 308, 327, 613, 19;
362/235; 379/396; 381/386; 600/163,
600/245; 40/564; 250/231.12; 307/64;
385/50
See application file for complete search history.

(56) References Cited

U.S. PATENT DOCUMENTS

| | | | |
|---|---|---|---|
| 5,886,304 A | 3/1999 | Schlenzig | |
| 6,167,648 B1* | 1/2001 | Dimmick | G09F 9/33 313/51 |
| 6,270,229 B1 | 8/2001 | Chien | |
| 7,147,356 B2 | 12/2006 | Tamaki | |
| 7,229,197 B2 | 6/2007 | Tanaka | |
| 7,878,673 B2 | 2/2011 | Kempkey | |
| 7,922,355 B1* | 4/2011 | Morejon | F21S 8/00 362/247 |
| 8,299,903 B2 | 10/2012 | Haase | |
| 8,300,869 B2 | 10/2012 | Marlin | |
| 9,628,887 B2* | 4/2017 | Hovanky | H04R 1/08 |
| 9,756,409 B2* | 9/2017 | Hofmann | F21V 33/0056 |
| 2002/0105230 A1* | 8/2002 | Ziegler | H02J 9/062 307/64 |
| 2007/0081320 A1* | 4/2007 | Gilbert | H05B 33/08 362/34 |
| 2007/0223770 A1 | 9/2007 | Fujisawa | |
| 2007/0276191 A1* | 11/2007 | Selover | A61B 1/06 600/245 |
| 2008/0199036 A1* | 8/2008 | Tsai | H04R 1/028 381/386 |
| 2009/0034778 A1 | 2/2009 | Chi | |
| 2009/0069633 A1* | 3/2009 | Orihara | A61B 1/041 600/163 |
| 2010/0067224 A1* | 3/2010 | Wu | H01L 33/58 362/235 |
| 2010/0272306 A1 | 10/2010 | Franciscus | |
| 2010/0302786 A1* | 12/2010 | Wilcox | F21V 5/008 362/327 |
| 2011/0014955 A1 | 1/2011 | Kim | |
| 2011/0317846 A1 | 12/2011 | Yuan | |
| 2012/0008323 A1 | 1/2012 | Lazzeroni | |
| 2012/0212929 A1* | 8/2012 | Li | G03B 21/2033 362/19 |
| 2012/0293722 A1 | 11/2012 | Kawaida | |
| 2013/0279197 A1* | 10/2013 | Holman | F21V 7/0058 362/613 |
| 2014/0146069 A1* | 5/2014 | Tan | G06F 3/011 345/589 |
| 2016/0116135 A1* | 4/2016 | Wilcox | F21V 5/008 362/308 |
| 2016/0282537 A1* | 9/2016 | Ninan | G02B 6/0025 |
| 2016/0343226 A1* | 11/2016 | Fischer | G01K 1/024 |
| 2017/0104866 A1* | 4/2017 | Campbell | G06F 3/167 |
| 2017/0108725 A1* | 4/2017 | Morita | G02F 1/13318 |
| 2018/0167581 A1* | 6/2018 | Goesnar | H04N 7/15 |

FOREIGN PATENT DOCUMENTS

| | | |
|---|---|---|
| EP | 1037445 | 9/2000 |
| EP | 2282491 | 2/2011 |
| JP | 9-065466 | 3/1997 |
| JP | 09-212107 | 8/1997 |
| JP | 11-317106 | 11/1999 |
| JP | 2004-248203 | 9/2004 |
| JP | 2005-323146 | 11/2005 |
| JP | 2006-157841 | 6/2006 |
| JP | 2007-288679 | 11/2007 |
| JP | 2008-109237 | 5/2008 |
| JP | 2009-267503 | 11/2009 |
| JP | 2012-199015 | 10/2012 |
| KR | 100992539 | 11/2010 |
| WO | 2007/072338 | 6/2007 |
| WO | 2009/084557 | 7/2009 |
| WO | 2014/062389 | 4/2014 |

\* cited by examiner

LIGHTING FOR AUDIO DEVICES

CROSS-REFERENCE TO RELATED APPLICATIONS

This application claims priority to U.S. Provisional Patent Application No. 61/832,032 filed 6 Jun. 2013 which is hereby incorporated by reference in its entirety.

TECHNOLOGY

The present invention relates generally to lighting for audio devices. More particularly, embodiments of the present invention relates to a curved light pipe that functions as a visual indicator.

BACKGROUND

A speakerphone is a telephonic device that allows a group of people on one end of a phone connection (the "speakerphone" end) to participate in a conversation with one or more people at another end (the "far" end) of the connection. The speakerphone may include a sound field capture system and a sound field rendering system. The capture system consists of a set of microphones, which capture and convert the voices at the speakerphone end of the connection into electronic signals for transmission to the far end of the connection. The rendering system consists of a set of speakers for broadcasting the voice or voices from the far end of the connection to participants at the speakerphone end. In order to more evenly capture and broadcast sound throughout a room, the microphone and speaker transducers may be arranged in a circular array. The circular configuration may also be used to capture and render spatial sound effects within the room.

In some instances, a speakerphone may include a visual indicator to show the status of a call. In one approach, the call status may be displayed on a display panel coupled to the speakerphone device. Generally, the display panel is a liquid crystal display (LCD) located on one side of the speakerphone device below the microphone and speaker transducer arrays. Due to the nature and location of the display panel, the call status may be difficult to view from all but a narrow range of azimuths and altitudes.

In another approach, a colored light may be used to indicate whether the speakerphone is on-call or the microphone is muted. For example, a point-source emitter may be placed along the central axis of the speakerphone device. This approach may increase the visibility of a visual indicator. However, it has the potential of having the indicator light and/or the indicator light's support structure occlude the microphone transducer arrays in the center of the speakerphone.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
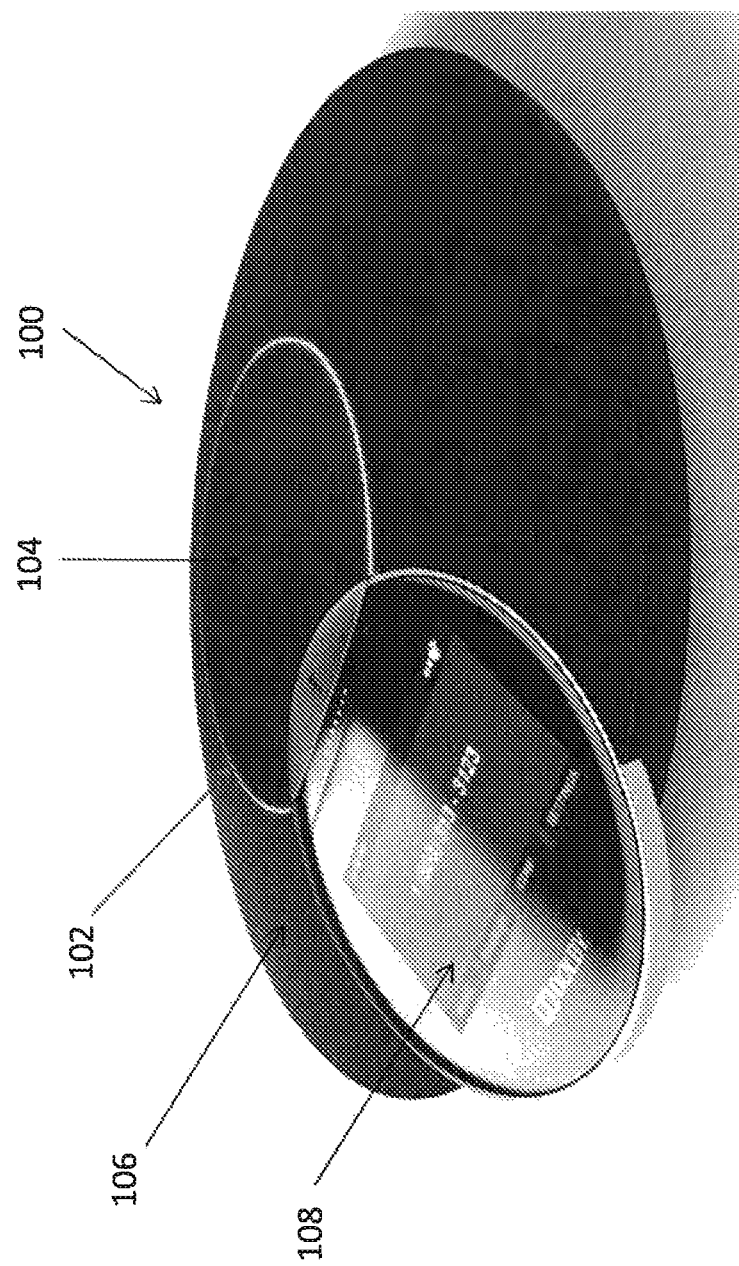
FIGS. 1A and 1B illustrate a general view of a speakerphone device with a circular light pipe, according to an embodiment of the invention.

Example embodiments, which relate to lighting for audio and other electronic devices, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. INTERPOSED LIGHT PIPE
3. EXAMPLE INTERPOSED LIGHT PIPE USES
4. IMPLEMENTATION MECHANISMS—HARDWARE OVERVIEW
5. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below.

Audio devices that include co-located sound field capture and rendering systems, such as speakerphones, may achieve optimal results when these systems remain unobstructed. For example, the quality of sound captured by a microphone array may be significantly reduced if the speaker array occludes the microphone array, and the quality of the sound broadcast by the speaker array may be significantly reduced if the microphone array blocks the speaker array. Similarly, the sound quality that is captured or broadcast by a device may be optimal when the inclusion of other components, such as a visual indicator, within the audio device do not obstruct either the capture or rendering systems.

According to techniques described herein, a light distribution medium, also referred to herein as a light pipe, is interposed between different modules in an electronic device. By interposing the light distribution medium according to such techniques, the underlying support structure for an indicator light may be incorporated into the device in a manner that does not interfere with the acoustical integrity of audio components such as sound field capture and sound field rendering systems. The light distribution medium may be added to a device without significantly impacting the vertical footprint of the device.

In some embodiments, a device in which the light distribution medium is incorporated includes an inner module and an outer module that substantially surrounds a perimeter of the inner module. A plurality of light emitters are positioned under the inner module and project light radially outward. The light distribution medium transports the light projected from the plurality of light emitters to an edge of the light distribution medium. The edge has a diffusive surface and traverses a substantial portion of a boundary between the inner module and the outer module. The diffusive surface may cause the edge of the light distribution medium to give off a uniform glow effect.

In some embodiments, the light distribution medium is used as a visual indicator for a device. The visual indicator is used to convey information with respect to an operation of a device. For a speakerphone device, the visual indicator may be used to identify the status of a call, such as whether a call is muted or on hold. Due to the positioning of the light distribution medium, the visual indicator may be clearly visible at a wide range of azimuths and altitudes within a room.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Interposed Light Pipe

According to techniques described herein, a light pipe is interposed between different modules in an audio or other electronic device. "Light pipe" is herein used interchangeably with "light distribution medium" and is not intended to delineate any particular shape for the medium. For example, the light pipe may not be a straight, tubular design but rather curved and dish-shaped as described in further detail below. Other custom shapes may also be used and may conform to the contours of the modules (e.g., the shape of the modules' housing) between which the light pipe is interposed. The light pipe transports light from a light source along a gap between the different modules to an exit point (e.g., the terminal edge of the light pipe) where the light is scattered to create a "glow" effect.

The modules between which the light pipe is positioned may be any device component, system, or subsystem that performs a particular function or a particular set of functions. In an embodiment, a module may be all or part of a sound field rendering system, including a set of speakers and a speaker enclosure. In another embodiment, a module may be all or part of a sound field capture system, including a microphone array and a microphone array housing. In yet another embodiment, the module may include a user interface element, such as a set of one or more buttons or a touch screen, that performs a particular function or set of functions in direct response to a user interaction. For example, the module may be a call mute button that, when pressed, toggles between muting and unmuting a speakerphone during a conference call. In yet another embodiment, a module may be a projection system for projecting images and/or video onto a projection screen. For example, the module may include a projector lens and a light source and/or other projector elements (e.g., a prism, a set of dichroic mirrors, etc.).

FIGS. 1-7 illustrate different views of an audio device with a circular light pipe, according to an embodiment. "Circular" as used herein may refer to any shape with rounded edges and no corners. The circular shape may also be segmented as described in further detail below. Thus, example shapes of a circular light pipe may include, without limitation, circles, ovals, ellipses, broken circles, broken ovals, broken ellipses, etc. A circular light pipe may be advantageous in many implementations. For example, a circular shape facilitates a more even distribution of light across the terminal edge of the light pipe allowing for a more uniform glow. In addition, the circular shape may be more easily visible from a wide range of azimuths and angles as there are no corners that may obstruct a view of the visual indicator.

A circular design may be advantageous in some audio devices that use a circular design to provide and enhance audio effects. For example, in a spatial speakerphone device, optimal results may occur when the central axes of a circular array of microphones are coincident. One physical configuration involves positioning the transducer arrays concentrically, and then separating the arrays vertically so that occlusion is reduced. The circular transducer arrays may also be used to capture and render three dimensional audio effects. To minimize the vertical profile of the device, the microphone array may be placed in a dish-shaped depression in the center of the speaker enclosure array. The dish shape provides an acoustically transparent transition between the microphones' near and far sound fields. The light pipe described herein may be interposed between the microphone and speaker arrays. For a circular device such as the present physical configuration, the form of the visual indicator (e.g., the shape of the terminal edge of the light pipe) becomes a circular ring or "halo" around the edge of the microphone dish.

Figure 1B:
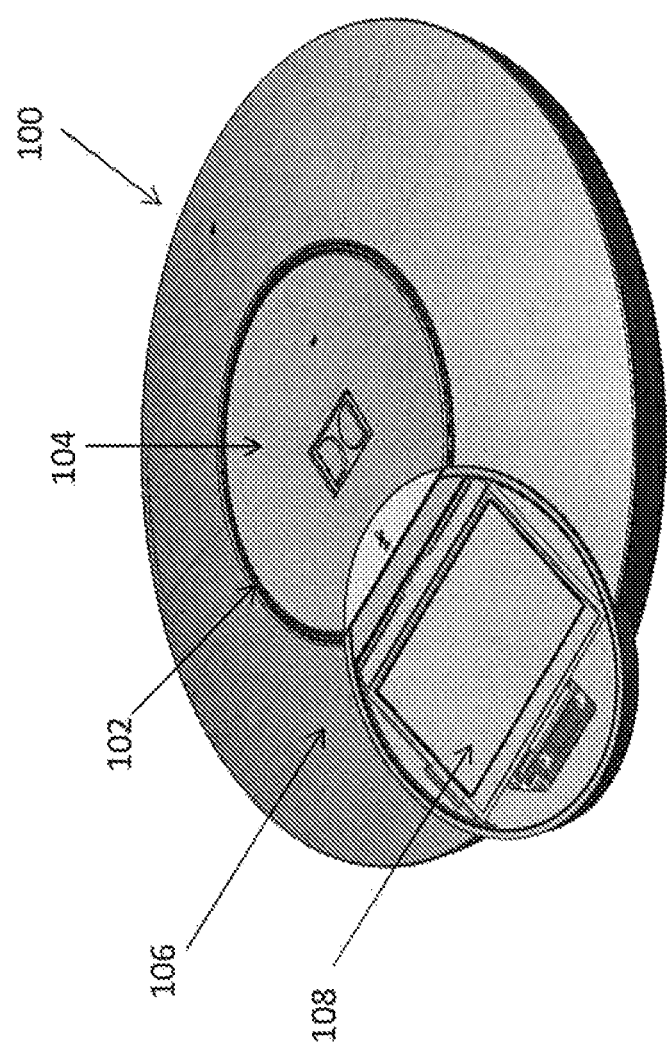

FIGS. 1A and 1B illustrate a general view of a speakerphone device with a circular light pipe, according to an embodiment. Speakerphone device 100 generally comprises light pipe 102, inner module 104, outer module 106, and control panel 108. With the device fully assembled, only a terminal edge of light pipe 102 is visible. The remaining portion of light pipe 102 is below the surface of the device and hidden from view. The terminal edge of light pipe 102 substantially traverses a border between inner module 104 and outer module 106 thereby forming a light ring around inner module 104. From an overhead view, light pipe 102, inner module 104, and outer module 106 are approximately concentric to one another, sharing approximately the same center. Vertically, there may be separation between the centers of these elements. For example, the center of outer module 106 may be slightly below the center of inner module 104. Outer module 106 may include a circular array of speakers around the periphery of the device that surround, and may be positioned below, a circular array of microphones in inner module 104. Although outer module 106 and the edge of light pipe 102 are depicted as substantially encircling inner module 104, other shapes are also possible.

For example, outer module 106 may form a square, triangle, or otherwise substantially surround an edge or other perimeter of inner module 104, depending on the particular implementation. Outer module 106 and the edge of light ring 102 may completely surround inner module 104 or may terminate at the edge of control panel 108. In addition or alternatively, the light ring and/or outer module may be segmented resulting in breaks in the circle. "Substantially surrounded" may thus refer, without limitation, to a complete surrounding or a segmented surrounding with one or more gaps. Control panel 108 may include a user interface for controlling operation of the device. For example, control panel 108 may include a touch screen, physical buttons, a display panel, or any other mechanism for interacting with the user (e.g., receiving input, displaying output, etc.).

Figure 2:
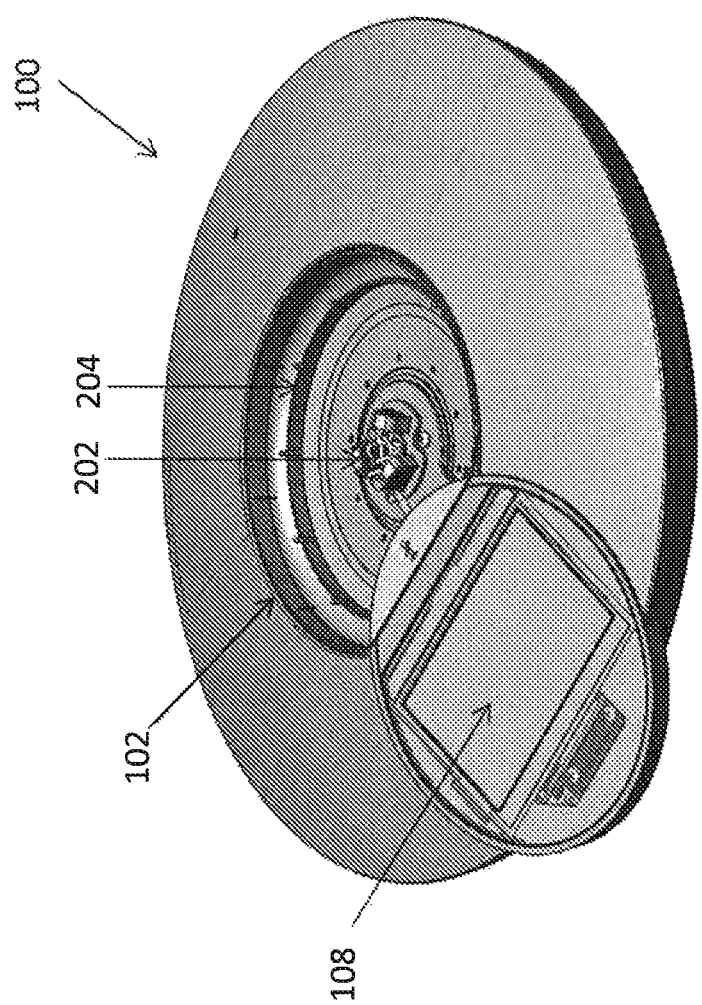
FIG. 2 illustrates a general view of a speakerphone device with a circular light pipe and a cover removed, according to an embodiment of the invention.

FIG. 2 illustrates a general view of a speakerphone device with a circular light pipe and a cover removed. With the cover of inner module 104 removed, microphone transducer array 202 is visible. The microphones in microphone transducer array 202 may be arranged in a circle to capture sound and spatial cues from different locations within a room. Microphone transducer array 202 may be positioned in a dish-shaped depression to provide a transparent acoustic transition between near and far sound fields that are captured. The light pipe may be dish-shaped such that it sits under inner module 104, which is a microphone module in the present example. In other embodiments, inner module 104 may be another audio or electronic component. For example, inner module 104 may be a speaker rendering system that includes a set of one or more speakers, and outer module 106 may be a speaker microphone system that includes a set of one or more microphones. Other physical configurations of modules and combinations of modules may be used, depending on the particular implementation. Light pipe 102 curves upward and outward following the shape of a microphone dish (not shown) and terminates at or near the edge of the dish Light pipe 102 may also include support structure 204 to support the microphone dish for inner module 104. The microphone dish may be fastened or otherwise secured to the ribbing of support structure 204. The dish-shape of light pipe 102 allows light pipe 102 to be inserted directly under a microphone dish to provide a widely viewable indicator light without affecting the acoustically transparent transition between the near and far sound fields in the inner module. In other embodiments, instead of a microphone dish, support structure 204 may be used to support the housing and/or other components of inner module 104. For example, support structure 204 may be used to support a speaker enclosure or a projector. In alternative embodiments, support structure 204 may be omitted and inner module 104 may be secured by other means or simply rest on top of inner module 104.

Figure 3:
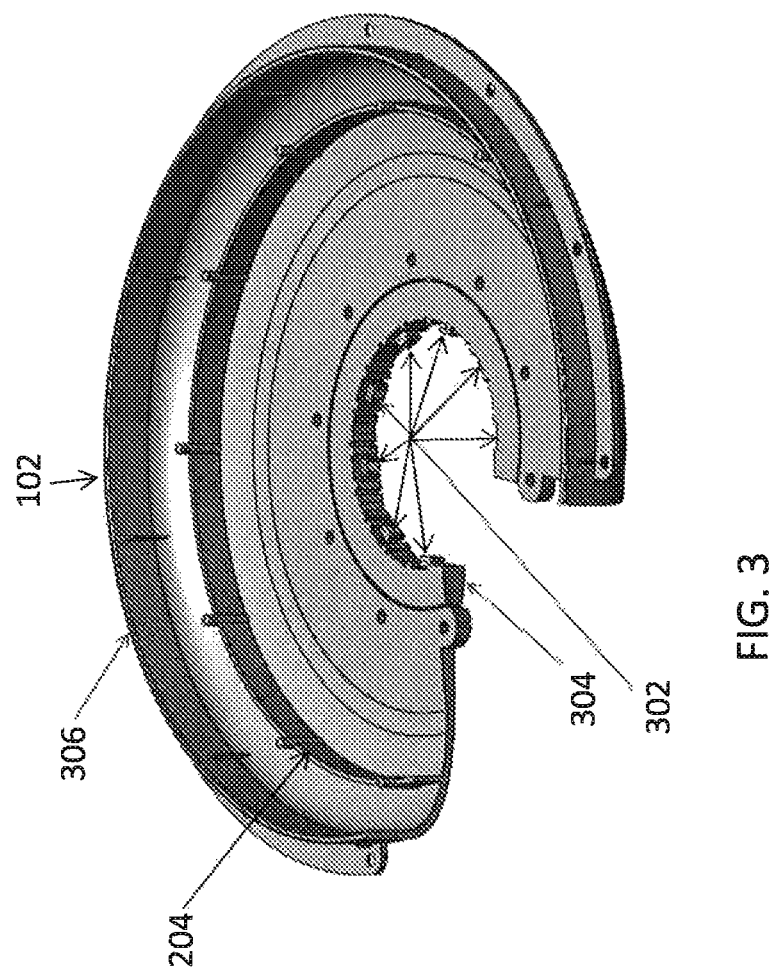
FIG. 3 illustrates an isometric view of a light pipe, according to an embodiment of the invention.

FIG. 3 illustrates an isometric view of a light pipe. Light emitters 302 may be arranged in a circular array with each light emitter projecting radially outward in a different direction forming a planar horizontal light bundle. Horizontally, light emitters 302 may be located at or near the center of the microphone and/or speakerphone transducer arrays. Vertically, light emitters 302 may be positioned above the speaker transducers but below microphone transducer array 202. The light from light emitters 302 may be projected into an entrance point of light pipe 102. The entrance point may form a circle around light emitters 302 such that light is introduced from each of individual light emitter at different areas of light pipe 102. Light emitters 302 may be distributed evenly, with equal spacing between each light emitter, around the base of light pipe 102 to ensure an even illumination of the light ring. Terminal edge 306 may have a diffusive surface texture that scatters the light in many different angles as the light exits. Without the diffusive surface, the light ring would have hot spots projecting narrow beams of light upward to the ceiling for each light emitter. The nature of the diffusive surface texture may vary from implementation to implementation. The diffusive surface may be generated, for example, by roughening plastic or glass at terminal edge 306. In another example, a diffusive surface material such as non-absorbing powders or some other light diffuser may be added to terminal edge 306. The siding of light pipe 102 may directly abut the siding of inner module 104 and outer module 106, or there may be a slight air gap between one or both modules, depending on the particular implementation.

Figure 4:
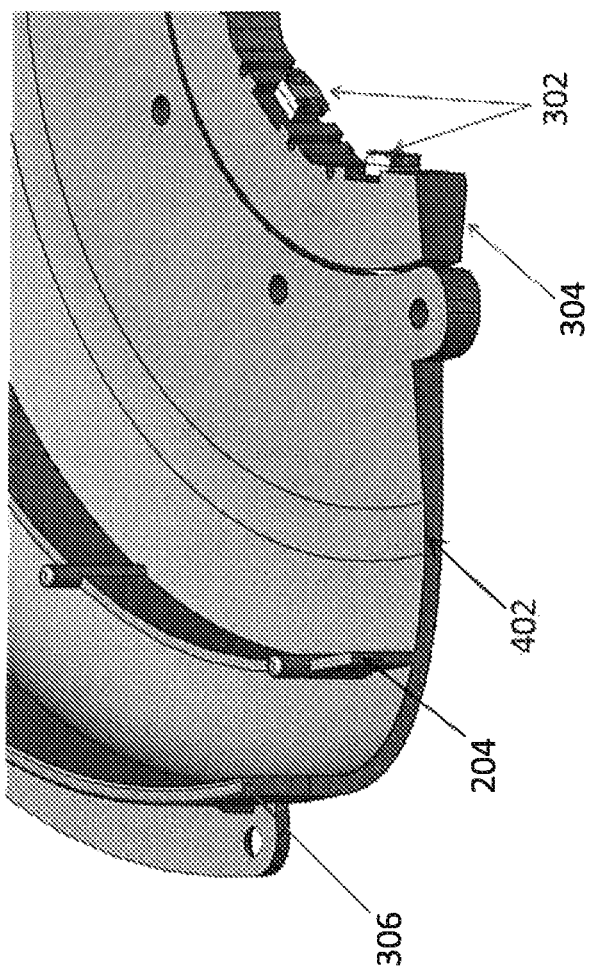
FIG. 4 illustrates an isometric view close-up of a light pipe, according to an embodiment of the invention.

FIG. 4 illustrates an isometric view close-up of a light pipe. Light concentrator 304 concentrates the light emitted from light emitters 302 and introduces the light into light pipe 102. Light pipe 102 transports the light through core 402, which may be positioned in between a gap in inner module 104 and outer module 106, and to terminal edge 306 where the light exits. Although light concentrator 304 and light pipe 102 are depicted as separate pieces, in other embodiments they may be a single piece manufactured from the same material. For example, both light pipe 102 and light concentrator 304 may be part of the same piece of plastic or glass. In other embodiment, light concentrator 304 may be omitted, and light emitters 302 may directly project the light bundles into light pipe 102 (e.g., through an edge in the plastic or glass material).

Figure 5:
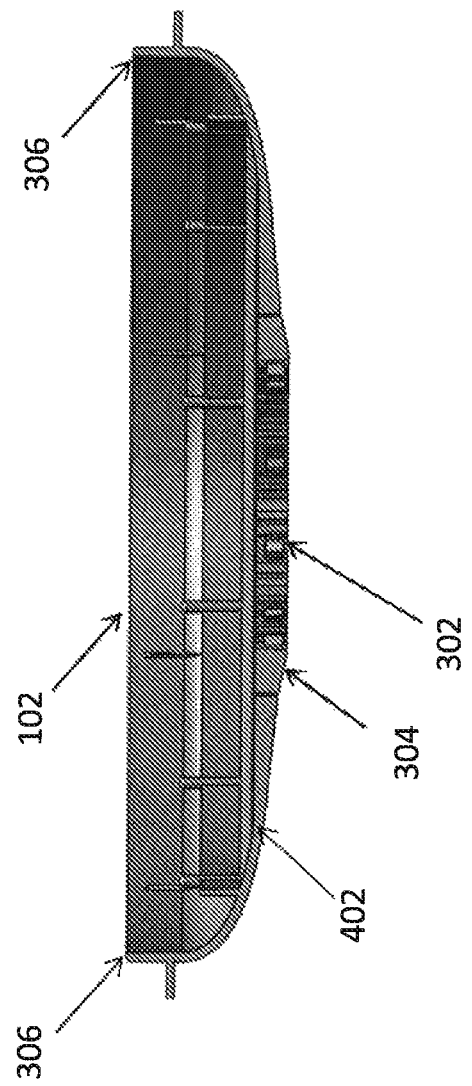
FIG. 5 illustrates a cross section view of a light pipe, according to an embodiment of the invention.

FIG. 5 illustrates a cross section view of a light pipe. Light emitters 302 are positioned at the base of the dish and project light radially outward and upward toward terminal edge 306. As illustrated, the curved shape of the light pipe allows the light pipe to easily fit under a microphone dish In other embodiments, the light pipe may be a different shape to conform to the contours of the inner and/or outer module. For example, the light pipe may be cone-shaped to easily fit under a speaker cone or any other shape that conducts light from under the inner module to a ring substantially surrounding inner module.

Figure 6:
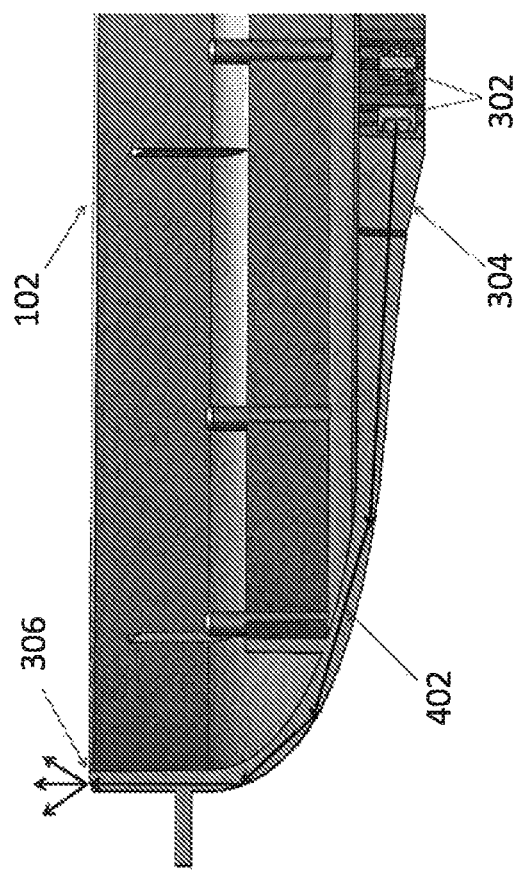
FIG. 6 illustrates a cross section close-up view of a light pipe, according to an embodiment of the invention.

FIG. 6 illustrates a cross section close-up view of a light pipe. The arrows illustrate an example path of the light bundles that are emitted from light emitters 302. The light is projected into concentrator 304, which concentrates the light and introduces the light into light pipe 102. Light pipe 102 is designed to minimize the loss of light between the light emitters and the terminal edge. The shape and refractive index of light pipe 102 cause internal reflections, which causes the light to reflect off the boundary of light pipe 102 and prevents the light from exiting core 402 until the light reaches terminal edge 306. Light pipe 102 may be molded from a clear material such as glass or plastic and/or be lined with reflective material. Core 402 may be hollow or may be solid (e.g., glass or plastic). Once the light reaches terminal edge 306, the light exits the light pipe. The diffusive surface texture of terminal edge 306 scatters the light in many different directions as it exits. The surface texture at the terminal edge obscures the point-source nature of the emitters, producing a uniformly glowing surface. The relatively long length for the dish's light path provides an opportunity for the light bundles from the individual emitters to mix together within the core of light pipe 102, resulting in an even luminosity around the circumference of the dish.

Figure 7:
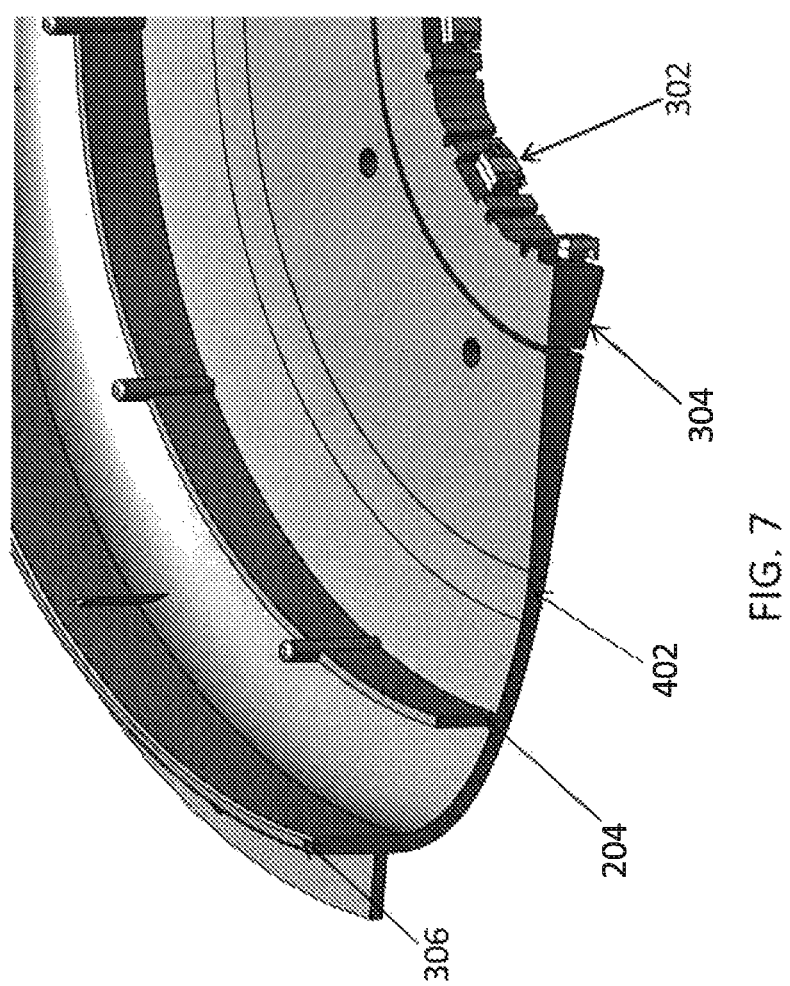
FIG. 7 illustrates a cross section isometric view of a light pipe, according to an embodiment of the invention.

FIG. 7 illustrates a cross section isometric view of a light pipe. As detailed above, the light from light emitters 302 may be conducted outward and upward from light emitters 302, through core 402 of light pipe 102 to terminal edge 306.

Although a circular design is depicted in FIGS. 1-7 and may be advantageous in certain devices, other shapes may also be used for the light pipe depending on the design of the device. In other embodiments, multi-sided shapes including, without limitation, triangles and rectangles may be used. Thus, the term "ring" does not imply a circular shape, but may be any shape that substantially surrounds inner module 104. The corners of a multi-sided shape may be rounded to prevent light clusters from appearing and to allow for a more uniform glow. For example, the light pipe may form a triangular ring with rounded corners around inner module 104 rather than the circular ring depicted in FIGS. 1-7.

In some embodiments, terminal edge 306 of light pipe 102 may be proud of the surface of the device. For example, terminal edge 306 may protrude by approximately 0.5 to 1 millimeter above the nearest surface inner module 104 and/or outer module 106. This approach may be used to create a "halo" effect as the lighted ring appears above the surface of the device. A slight protrusion may also allow for better visibility from the side of the device without significantly reducing the contrast of the indicator light. In an alternative embodiment, the edge of the light pipe may be placed below the surface of the device. This approach would restrict the viewing angle of the light ring; however, this may be useful, for example, as an indicator around a touch screen interface so that it is restricted to the user of the device and is not visible to all other participants in the room. In another embodiment, the terminal edge may be flush with the surface of the device. This approach allows the surface of the device to be smooth without significantly restricting the visibility of the light.

The light ring depicted in FIGS. 1-7 has a smooth flat edge on both sides. However, in other embodiments texture could be added to the edge of the light ring to create different visual effects. For example, when viewing the light ring from an overhead view, one or both edges of the ring could have a triangular, sawtooth, or rectangular pattern.

An advantage of the physical configurations described herein is that relatively few emitters may be used to give good illumination uniformity. Besides being less costly, having fewer emitters means consuming less energy, making the resulting configuration energy efficient. The emitters can be made from Light Emitting Diodes (LEDs), and can be monochrome or multi-colored. The LEDs may have a conical radiation pattern. If such LEDs are used, the light pipe also serves to contain radiation cone; it reduces the vertical spread of the light bundles and thereby increases the optical efficiency. Horizontal spread is advantageous because it aids the mixing of the individual LEDs' outputs. The mixing aids in having an even luminosity around the rim of the light ring. The mixing may also be used to control the color of the light ring when it is illuminated. The light emitters may include LEDs that can emit red, green, and/or blue light. The device may generate any hue by modulating the brightness of each of the three colors according to the RGB color model. The modulated red, green, and blue light mix within the core of the light pipe before reaching the terminal edge and illuminating the light ring.

In some embodiments, the light ring formed by light pipe 102 may be segmented, rather than continuous. For example, instead of the continuous circular ring depicted in FIGS. 1A and 1B, terminal edge 306 may be split into segments to create a broken circle design. In between each segment, the light pipe may be obscured by an opaque material. This approach may also be applied to multi-sided shapes to create a broken triangle, rectangle, or other design. The number and length of the segments may vary from implementation to implementation. Each segment of the ring may be controlled by a different light emitter or set of light emitters. For example, each segment may include a red, green, and blue light emitter. The light within each segment is mixed, but may remain separate from other light pipe segments (e.g., each segment of the light pipe may have its own core). Each segment of the ring could thus be illuminated at a different brightness and/or with a different color.

In the physical configuration depicted in FIGS. 1-7, light emitters 302 are obscured by the housing of the inner module (e.g., the microphone array housing). In an alternative configuration, light emitters 302 may be visible through a mesh or grating surface on the device. For example, the housing of inner module 104 may allow light to pass through such surfaces instead of being opaque. This would create a wheel type of effect for a circular light ring shape. The light ring would be the rim and the LEDs the hub.

In some embodiments, light emitters 302 may feed more than one light pipe. For example, in addition to light pipe 102, light emitters 302 may project light into a second light pipe. Light pipe 102 curves toward the top of the device, while the second light pipe may curve toward the bottom of the device to shine light underneath the device onto a table. The different light pipes may be fed from the same light sources or separate light sources, depending on the particular implementation, and may allow different colors and information to be displayed in each area.

Although FIGS. 1-2 depict a speakerphone device, the light pipe may be interposed between modules of other type of devices as well, depending on the particular implementation. Examples include, without limitation, accessory microphones, headphones, media playback devices, and other electronic devices. In an example embodiment, a satellite microphone may include a microphone array surrounding a mute button that toggles between activating and deactivating the microphone array when pressed. The light pipe may be interposed between the mute button and the microphone array, with the microphone array acting as the outer module and the mute button acting as the inner module. Thus, the light source is positioned under the mute button, and the light pipe guides the light outward under the mute button, upward in between the microphone module and the mute button, to a terminal edge that substantially surrounds the mute button, thereby creating a light ring around the mute button. For headphones, the light pipe may be interposed between the headphone speakers (the inner module) and the ear-pad (outer module).

3. Example Interposed Light Pipe Uses

The light ring formed by light pipe 102 may be used as a visual indicator to convey various types of information. The information and the manner in which the information is conveyed may vary from implementation to implementation based on the nature of the device. In a speakerphone device, for example, the light ring may be used to indicate the status of a call. Using control panel 108, a user may, by pressing a physical button or an icon on a touchscreen display, select to mute a call. Muting a call prevents the listener on the far end of the phone call from hearing what the participants at the speakerphone end are saying by deactivating the microphones and/or ceasing to transmit noise to the far end. In response to muting the call, light emitters 302 may be activated, propagating light through light pipe 102 and causing the light ring to become illuminated. The illuminated light ring may be viewed from a large range of azimuths and angles. Thus, participants in a conference call at the speakerphone end may easily determine when the call is muted. When the call is unmuted (e.g., the mute button is pressed again), light emitters 302 may be deactivated causing the illumination of the light ring to cease. In a similar manner, the light ring may be illuminated or turned off in response to other input to convey other information. In a telephonic device, the light ring may illuminate when a call is placed on hold, a call is connected, and/or a call is incoming. In a media playback device, the light ring may be illuminated when music or other media playback is initiated.

Different colored or multi-color light emitters can be used to provide the light source and convey different, color-coded information to the user. In a telephonic device, the light ring may be illuminated one color (e.g., red, etc.) when the call is muted, another color (e.g., green, etc.) when on call and unmuted, and a third color (e.g., blue, etc.) when an incoming or outgoing call supports three-dimensional audio effects. Other colors may be used to indicate the type of call to which the telephonic device is connected, the quality of the audio.

Light emitters 302 may be distributed evenly around the base of the light pipe to ensure an even illumination of the light ring. However, light emitters 302 could be deliberately controlled to provide regions of higher or lower intensity around the light ring. The intensity could indicate the level of the sound being received into the device, or picked up by the microphones on the device. The light ring may become brighter as the sound picked up by the microphones becomes louder and dimmer as the sound becomes quieter. Similarly, the intensity could indicate the volume level for broadcasting sound from the speakers. The light ring may be brighter at louder volumes and dimmer as a user lowers the volume of the device. The intensity could be varied over time to provide the effect of the ring pulsing in brightness. For example, the light ring may pulsate when an incoming call is detected or pulsate to the beat of music being played.

Other lighting effects may also be applied to the light ring to convey light-effect coded information. For example, each individual light emitter can be controlled to be illuminated in sequence to give the perception of a moving light source around the light pipe. When the edge of the light pipe forms a circular ring around the inner module, this gives the effect of a light moving in a circle. For a segmented light pipe, each segment of the light pipe may be illuminated in a different sequence and/or with different colors. In addition or alternatively, different light pipes may be used to convey different or the same information to different areas of a device. Such lighting effects may be used to convey, without limitation, any of the information described above such as the status of a call or other operation of a device, the quality of the audio being recorded or broadcast, the intensity/volume of the audio being recorded or broadcast, any other type of information responsive to input received by the device, etc.

4. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
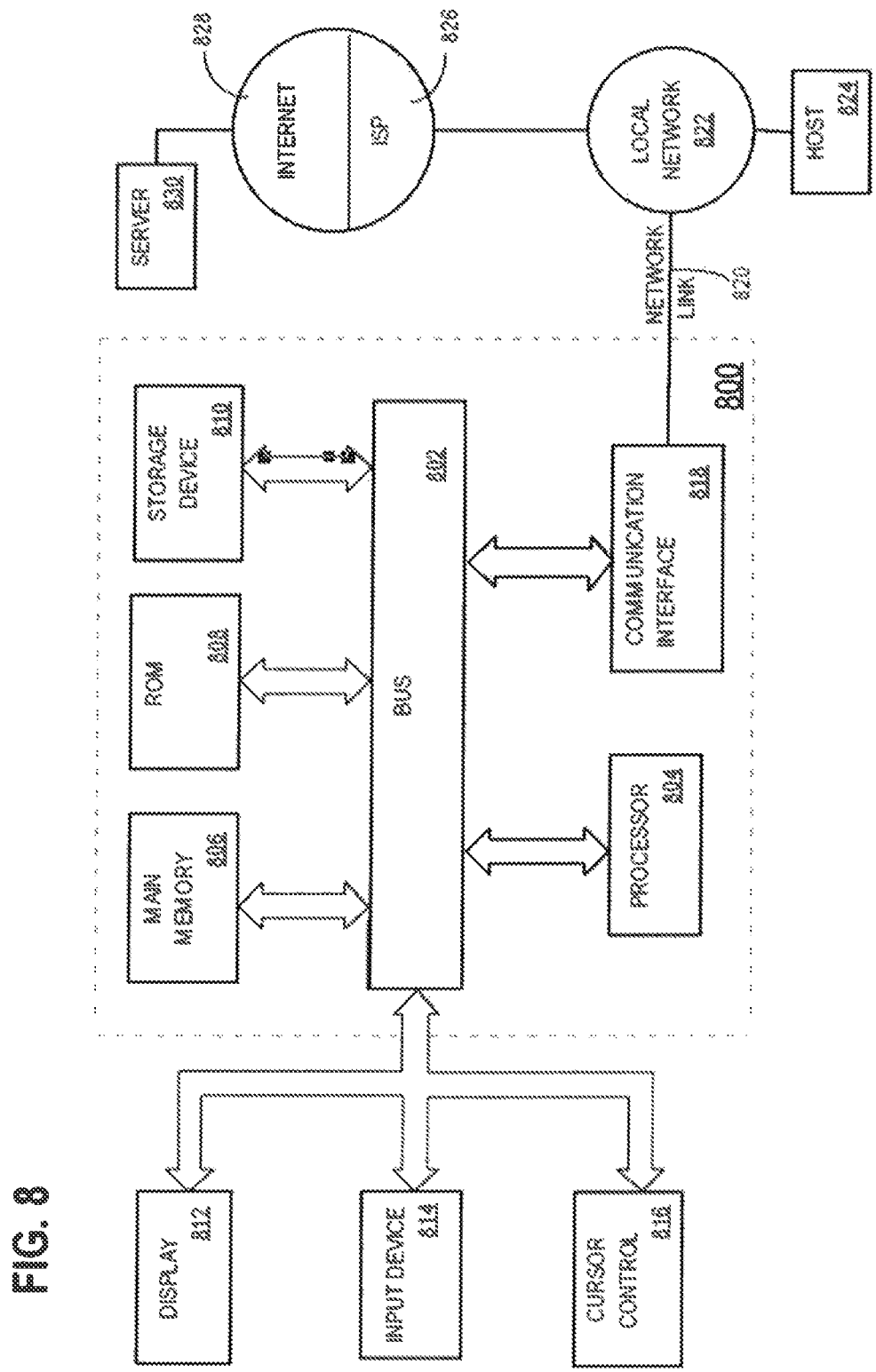
FIG. 8 illustrates an example hardware platform on which a computer or a computing device as described herein may be implemented, according to an embodiment of the invention.

For example, FIG. 8 is a block diagram that illustrates a computer system 800 upon which an example embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a liquid crystal display, for displaying information to a computer user. An input device 814, including alphanumeric and other keys, is coupled to bus 802 for communicating information and command selections to processor 804. Another type of user input device is cursor control 816, such as a mouse, a trackball, touchscreen, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

5. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. An apparatus comprising:
an inner module;
an outer module that substantially surrounds a perimeter of the inner module;
a plurality of light emitters under the inner module that project light radially outward;
a light distribution medium that transports light projected from at least some of the plurality of light emitters to an edge of the light distribution medium with a diffusive surface, the edge traversing a boundary between the inner module and the outer module;
wherein the light distribution medium is separate from, and interposes between, the inner module and the outer module;
wherein the outer module includes an array of speakers that surround an array of microphones in the inner module.

2. The apparatus of claim 1, wherein the light distribution medium is curved and transports light outward and upward from the at least some of the plurality of light emitters under the inner module along a curved path to the edge, the edge scattering the light as the light exits the light pipe to produce a uniform glow at the boundary between the inner module and the outer module.

3. The apparatus of claim 1, wherein the light distribution medium is dish-shaped.

4. The apparatus of claim 1, wherein the inner module includes a plurality of microphones for capturing sound and the outer module includes a plurality of speakers for rendering sound.

5. The apparatus of claim 1, wherein the inner module includes a plurality of speakers for rendering sound and the outer module includes a plurality of microphones for capturing sound.

6. The apparatus of claim 4, wherein the plurality of microphones are arranged in a circular array in the inner module and the plurality of speakers are arranged in a circular array in the outer module.

7. The apparatus of claim 1, wherein the edge of the light distribution medium forms a ring that substantially surrounds the perimeter of the inner module.

8. The apparatus of claim 7, wherein central axes for the inner module, the outer module, and the ring are coincident.

9. The apparatus of claim 7, wherein the ring is circular, triangular, or rectangular in shape.

10. The apparatus of claim 7, wherein the ring that substantially surrounds the perimeter of the inner module is segmented.

11. The apparatus of claim 1, wherein the edge of the light distribution medium is proud of a surface of the inner module and the outer module.

12. The apparatus of claim 1, wherein light emitted from two or more of the plurality of transmitters mixes together within the light distribution medium before reaching the edge of the light distribution medium.

13. The apparatus of claim 1, wherein the light emitters include at least one light emitting diode (LED) that generates a red light, at least one LED that generates a green light, and at least one LED that generates a blue light, the red light, the green light, and the blue light mixing together within the light distribution medium before reaching the edge of the light distribution medium, the apparatus modulating the intensity of the red light, the green light, and the blue light to control a hue generated when the red light, the green light, and the blue light exits the edge of the light distribution medium.

14. The apparatus of claim 1, the apparatus further comprising logic that causes the edge of the light distribution medium to be illuminated in response to a request to mute a call.

15. The apparatus of claim 1, the apparatus further comprising logic that causes the plurality of light emitters to illuminate the edge of the light distribution medium a first color in response to determining a first status associated with a call and a second color in response to determining a second status associated with the call.

16. The apparatus of claim 1, the apparatus further comprising logic that causes an intensity with which the edge of the light distribution medium is illuminated to change based on an intensity at which sound is being captured or broadcast.

17. A light distribution apparatus for transporting light from a light source to a terminal edge, the light distribution apparatus comprising:
a circular entrance point where light is introduced from one or more light emitters that project the light radially outward in different directions;
an exit point with a diffusive surface that scatters the light as the light passes through the exit point;
a dish-shaped core that guides light introduced at the circular entrance point outward and upward to the exit point and prevents light introduced at the circular entrance from escaping until the exit point, the exit point forming a rim around the dish-shaped core;
wherein the diffusive surface of the light distribution apparatus is separate from, and interposes between, an inner module and an outer module of an apparatus that includes the light distribution apparatus.

18. The light distribution apparatus of claim 17, wherein the core is one of a plastic or glass material and the exit point is roughened plastic or glass at a terminal end of the core.

19. The light distribution apparatus of claim 17, wherein the circular entrance point includes a light concentrator that concentrates the light emitted from the one or more light emitters and introduces the light into the core.

20. The light distribution apparatus of claim 17, further comprising a support structure coupled to the core, the support structure configured to support an inner module, the exit point forming a ring around the inner module.

21. The light distribution apparatus of claim 17, wherein a length associated with the core allows the light projected from a plurality of light emitters pointed in different directions to mix before the light reaches the exit point.

* * * * *